United States Patent Office 3,078,644
Patented Feb. 26, 1963

3,078,644
METHOD FOR ADSORBING AND SEPARATING
UNSATURATED ALIPHATIC HYDROCARBONS
Robert M. Milton, Buffalo, N.Y., assignor to Union
Carbide Corporation, a corporation of New York
Filed Jan. 19, 1960, Ser. No. 3,438
7 Claims. (Cl. 55—75)

This invention relates to a method for adsorbing fluids and separating a mixture of fluids into its component parts. More particularly, the invention relates to a method of separating unsaturated aliphatic hydrocarbons containing less than five carbon atoms per molecule with adsorbents of the molecular sieve type. Still more particularly, the invention relates to a method for preferentially adsorbing acetylene, ethylene, propylene and butene from a fluid mixture containing at least one member of the group consisting of normal saturated aliphatic hydrocarbons containing less than four carbon atoms per molecule, oxygen, hydrogen and nitrogen.

This application is a continuation-in-part of my copending application Serial No. 400,386 filed December 24, 1953, now abandoned.

Illustrating the utility of this invention, it may for example be desirable to remove acetylene from a hydrogen-containing stream when the latter is to be processed at low temperatures. This is because acetylene would deposit as a solid material and impair the operating efficiency of low temperature heat exchanges. With regard to ethylene adsorption, in the ethylene-air reaction to produce ethylene oxide, there is usually an excess of ethylene present in the off-gas from the reaction. This valuable component may be recovered for subsequent use from the off-gas by the present adsorption process.

Broadly, the invention comprises mixing molecules, in a fluid state, of the materials to be adsorbed or separated with at least partially dehydrated crystalline synthetic zeolite X.

Zeolite X and the method for making zeolite X are described in detail and claimed in U.S. Patent application Serial No. 400,389, filed December 24, 1953, now U.S. Patent No. 2,882,244 issued April 14, 1959 in the name of R. M. Milton.

It is the principal object of the present invention to provide a process for the selective adsorption of molecules from fluids. A further object of the invention is to provide a method whereby certain molecules may be adsorbed and separated by crystalline synthetic zeolite X from fluid mixtures of those molecules and other molecules.

Figure 1:
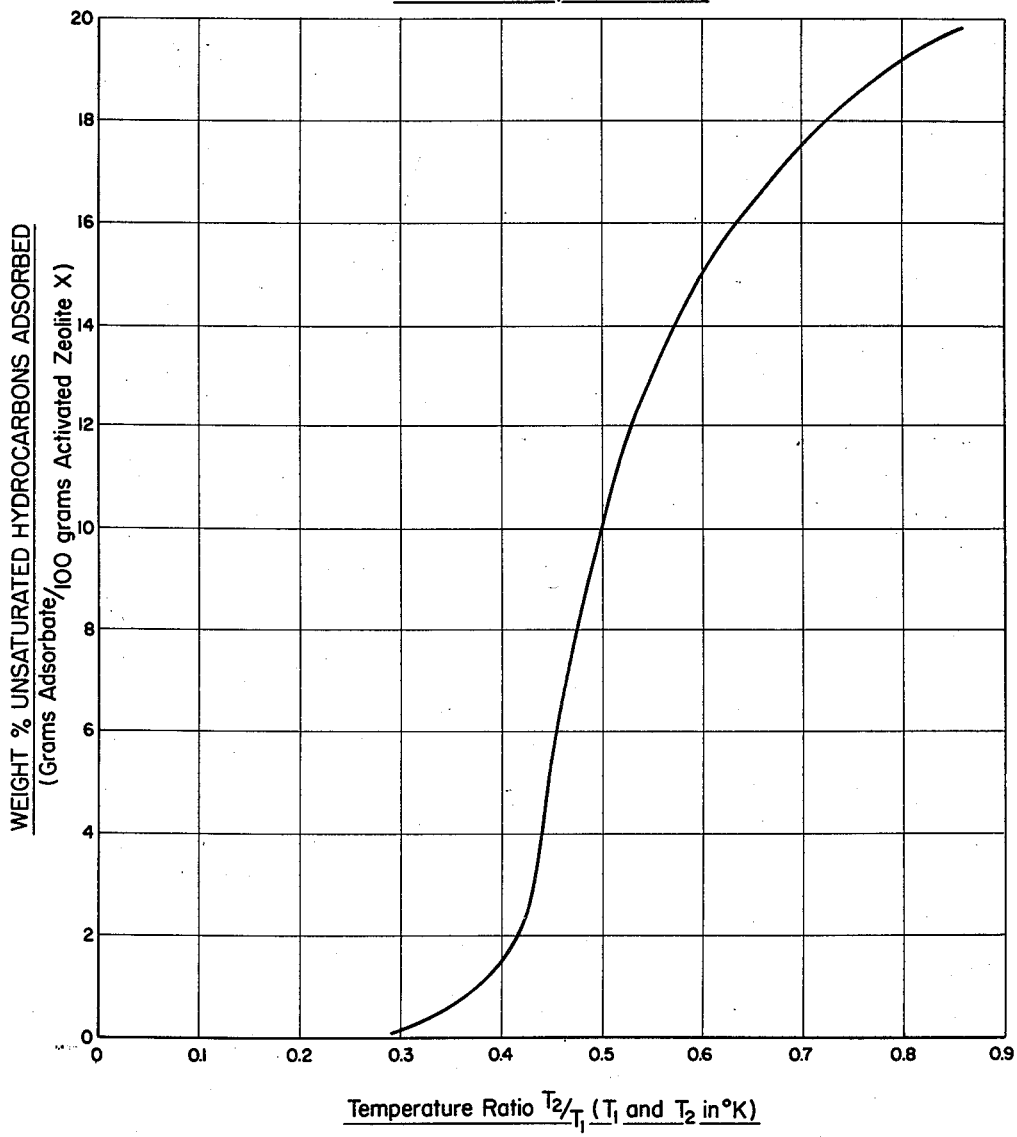
FIGURE 1 is a graph showing the weight percent of unsaturated hydrocarbons adsorbed versus the temperature ratio $T_2/T_1$ for zeolite X.

The formula for zeolite X may be written as follows:

$$0.9 \pm 0.2 M_{\frac{2}{n}}O : Al_2O_3 : 2.5 \pm 0.5 SiO_2 : YH_2O$$

In this formula "M" represents a metal, "n" its valence, and "Y" may be any value up to 8 depending on the identity of the metal and the degree of dehydration of the crystals. X-ray diffraction data may be employed to define the crystal structure of zeolite X. Such information and processes for synthesizing zeolite X are provided in U.S. Patent 2,882,244.

The adsorbents contemplated herein include not only the sodium form of zeolite X, which is a common form produced, but also crystalline materials obtained from such a zeolite by partial or complete replacement of the sodium ion with other cations. The sodium cations can be replaced, in part or entirely by ion exchange with other monovalent, divalent or trivalent cations. This may be accomplished by ion exchange techniques.

In tables which follow, the term "Weight percent adsorbed" refers to the percentage increase in the weight of the adsorbent. The adsorbent was activated by heating it at a reduced pressure to remove adsorbed materials. Throughout the specification the activation temperature for zeolite X was 350° C., and the pressure at which it was heated was less than about 0.1 millimeter of mercury absolute unless otherwise specified. Likewise, the pressure given for each adsorption is the pressure of the adsorbate under the adsorption conditions unless the contrary is specified.

The following data contained in Table I shows the adsorption of unsaturated aliphatic hydrocarbons containing less than five carbon atoms per molecule, normal saturated aliphatic hydrocarbons containing less than four carbon atoms per molecule, and low boiling point gases nitrogen, hydrogen and oxygen. In this table as elsewhere in the specification the term "weight percent adsorbed" refers to the percentage increase in the weight of the adsorbent.

TABLE I

| Adsorbent | Adsorbate | Temperature, °C. | Pressure, mm. Hg | Weight percent Adsorbed |
|---|---|---|---|---|
| $Na_2X$ | $C_2H_2$ | 25 | 1 | 4.6. |
| $Na_2X$ | $C_2H_2$ | 25 | 5 | 6.6. |
| $Na_2X$ | $C_2H_2$ | 25 | 25 | 9.8. |
| $Na_2X$ | $C_2H_2$ | 25 | 50 | 10.6. |
| $Na_2X$ | $C_2H_2$ | 25 | 200 | 13.3. |
| $Na_2X$ | $C_2H_2$ | 25 | 740 | 14.7. |
| $Na_2X$ | $C_2H_4$ | 25 | 5 | 1.4. |
| $Na_2X$ | $C_2H_4$ | 25 | 25 | 6.1. |
| $Na_2X$ | $C_2H_4$ | 25 | 37 | 7.1. |
| $Na_2X$ | $C_2H_4$ | 25 | 160 | 10.1. |
| $Na_2X$ | Butene-1 | 25 | 0.1 | 9.9 |
| $Na_2X$ | Butene-1 | 25 | 5 | 17.0. |
| $Na_2X$ | Butene-1 | 25 | 350 | 19.6. |
| $Na_2X$ | $C_3H_6$ | 25 | 0.1 | 2.2. |
| $Na_2X$ | $C_3H_6$ | 25 | 1 | 6.0. |
| $Na_2X$ | $C_3H_6$ | 25 | 2 | 8.5. |
| $Na_2X$ | $C_3H_6$ | 25 | 5 | 10.6. |
| $Na_2X$ | $C_3H_6$ | 25 | 48 | 14.9. |
| $Na_2X$ | $CH_4$ | 25 | 500 | less than 1%. |
| $Na_2X$ | $C_2H_6$ | 25 | 5 | 0.2. |
| $Na_2X$ | $C_2H_6$ | 25 | 25 | 0.8. |
| $Na_2X$ | $C_2H_6$ | 25 | 300 | 8.3. |
| $Na_2X$ | $C_2H_6$ | 25 | 700 | 10.2. |
| $Na_2X$ | $C_3H_8$ | 25 | 1 | 0.8. |
| $Na_2X$ | $C_3H_8$ | 25 | 4 | 2.6. |
| $Na_2X$ | $C_3H_8$ | 25 | 5 | 3.1. |
| $Na_2X$ | $C_3H_8$ | .25 | 25 | 11.1. |
| $Na_2X$ | $C_3H_8$ | 25 | 700 | 14.6. |
| $Na_2X$ | $H_2$ | 25 | 100 | less than 1%. |
| $Na_2X$ | $H_2$ | −196 | 100 | less than 1%. |
| $Na_2X$ | $O_2$ | −196 | 56 | 34. |
| $Na_2X$ | $O_2$ | −75 | 500 | 5.2. |
| $BaX$ | $O_2$ | −75 | 500 | 6.5. |
| $CaX$ | $O_2$ | −75 | 500 | 5.8. |
| $Na_2X$ | $O_2$ | 25 | 500 | less than 1%. |
| $Na_2X$ | $H_2$ | −196 | 5 | 24.8. |
| $K_2X$ | $H_2$ | −196 | 195 | 27.5. |
| $BaX$ | $H_2$ | −196 | 195 | 21.9. |
| $Na_2X$ | $H_2$ | −75 | 500 | 9.6. |
| $BaX$ | $H_2$ | −75 | 500 | 10.0. |
| $K_2X$ | $H_2$ | −75 | 500 | 7.9. |
| $Na_2X$ | $H_2$ | 25 | 500 | less than 1%. |
| $CaX$ | $H_2$ | −75 | 738 | 9. |
| $BaX$ | $H_2$ | −75 | 738 | 10.8. |
| $MnX$ | $H_2$ | −75 | 738 | 8.6. |
| $Ce_2X_3$ | $H_2$ | −75 | 738 | 5.3. |

A unique property of zeolite X is its strong preference for unsaturated molecules, providing of course, that these molecules are of a size and shape which permits them to enter the pore system. This is in contrast to charcoal and silica gel which show a main preference based on the volatility of the adsorbate. The following table shows the adsorption of acetylene, an unsaturated molecule, on charcoal, silica gel and sodium zeolite X.

| Adsorbate | Temperature (° C.) | Pressure (mm. Hg) | Weight Percent Absorbed | | |
|---|---|---|---|---|---|
| | | | $Na_2X$ | Silica Gel | Charcoal |
| Acetylene | 25 | 50 | 10.6 | 2.1 | 2.1 |

The greater the degree of unsaturation, the greater the affinity of zeolite X for the adsorbate. This is illustrated in the following data with a series of $C_2$ and $C_3$ hydrocarbons on sodium zeolite X.

| Pressure (mm. Hg) | Temperature (° C.) | Weight Percent Adsorbed on $Na_2X$ | | |
|---|---|---|---|---|
| | | $C_2H_6$ | $C_2H_4$ | $C_2H_2$ |
| 5 | 25 | 0.2 | 1.4 | 6.6 |
| 25 | 25 | 0.8 | 6.1 | 9.8 |
| | | $C_3H_8$ | | $C_3H_6$ |
| 1 | 25 | 0.8 | | 6.0 |
| 5 | 25 | 3.1 | | 10.6 |

An important characteristic of zeolite X is its property of adsorbing large amounts of adsorbates at low adsorbate pressures, partial pressures or concentrations. This property makes zeolite X useful in the removal of unsaturated aliphatic hydrocarbons containing less than five carbon atoms per molecule from gas and liquid mixtures since zeolite X has a relatively high adsorption capacity even when the material being adsorbed from a mixture is present in very low concentrations. Efficient recovery of minor components of mixtures is also possible. The high adsorption at low pressures on zeolite X is illustrated in the above Table I.

These data of Table I show that unsaturated aliphatic hydrocarbons containing less than five carbon atoms per molecule are more strongly adsorbed than any of the other components at comparable temperatures and pressures and illustrates several possible separations by means of zeolite X, i.e., the selective adsorption of unsaturated hydrocarbons from fluid mixtures containing both saturated and unsaturated hydrocarbons.

Table I shows that at the same temperature (25° C. in the table) acetylene is more strongly adsorbed at a given pressure than are oxygen, nitrogen, hydrogen, methane and ethane. Thus acetylene may be removed from mixtures comprising these less strongly adsorbed gases by means of zeolite X.

Similarly ethylene is more strongly adsorbed than oxygen, nitrogen, hydrogen, methane and ethane and zeolite X may be used in separating mixtures of ethylene from mixtures of ethylene with either named gases.

Likewise, propylene is more strongly adsorbed than propane, thus zeolite X may be used in separating propylene from propane.

An advantage that may be taken of this high adsorption of zeolite X at low pressures is the operation of adsorption processes at higher temperatures than are normally used with common adsorbates. The adsorptive power of physical adsorbents usually decreases with increasing temperature, and therefore while the adsorption capacity of many adsorbents in a certain separation may be sufficient if operated at one temperature, the capacity may not be sufficient to make operation feasible at a higher temperature. With strongly adsorbing zeolite X, however, substantial capacity is retained at higher temperatures.

Zeolite X may be used as an adsorbent for the purposes indicated above in any suitable form. For example, a column of powdered crystalline material has given excellent results as has a pelleted form obtained by pressing into pellets a mixture of zeolite X and a suitable binding agent such as clay.

The present process for separating unsaturated aliphatic hydrocarbons containing less than five carbon atoms per molecule from certain vapor mixtures depends upon interrelated properties of zeolite X with respect to the adsorbed phase. The first property is the selectivity of the internal surfaces of the crystal towards these unsaturated compounds as compared to saturated aliphatic hydrocarbons containing less than four carbon atoms per molecule, oxygen, hydrogen and nitrogen. As previously discussed and illustrated by Table I, zeolite X is capable of absorbing all these constituents based on a consideration of the zeolite X pore size and critical molecular dimensions of the compounds. For example, the pores of zeolite X are sufficiently large and in fact do receive methane, propane, ethylene, butene, nitrogen and hydrogen.

Based on these considerations, one skilled in the art would logically conclude that zeolite X would not possess any particular selectivity for unsaturated hyrocarbons in preference to the other constituents of the vapor mixture. Contrary to these expectations, it has been discovered that zeolite X possesses an extremely strong selectivity for unsaturated hydrocarbons to the substantial exclusion of saturated hydrocarbons, hydrogen, nitrogen and oxygen. One reason for this selectivity is the unsaturated nature of the more strongly held adsorbates as compared with the other possible constituents of the vapor mixture.

The second interrelated property is the relationship of the boiling point or vapor tension characteristics of an individual fluid or clearly related type of fluid to the capacity of the crystalline zeolite to adsorb the fluid at a given temperature and pressure. More specifically, it has been discovered that a relationship exists between the amount of fluid adsorbed and the temperature ratio $T_2/T_1$ where $T_1$ is the temperature in degrees Kelvin at which the adsorption is carried out, assuming that the temperature of the fluid and the adsorbent are in equilibrium. $T_2$ is the temperature in degrees Kelvin at which the vapor pressure of the fluid is equal to the partial pressure or vapor tension of the fluid in equilibrium with the zeolite adsorbent. Stated in another way, $T_2$ is the temperature at which the vapor pressure of the adsorbate is equal to the partial pressure of the adsorbate during adsorption. $T_2$ is actually the dew point determined at the adsorption conditions.

Figure 2:
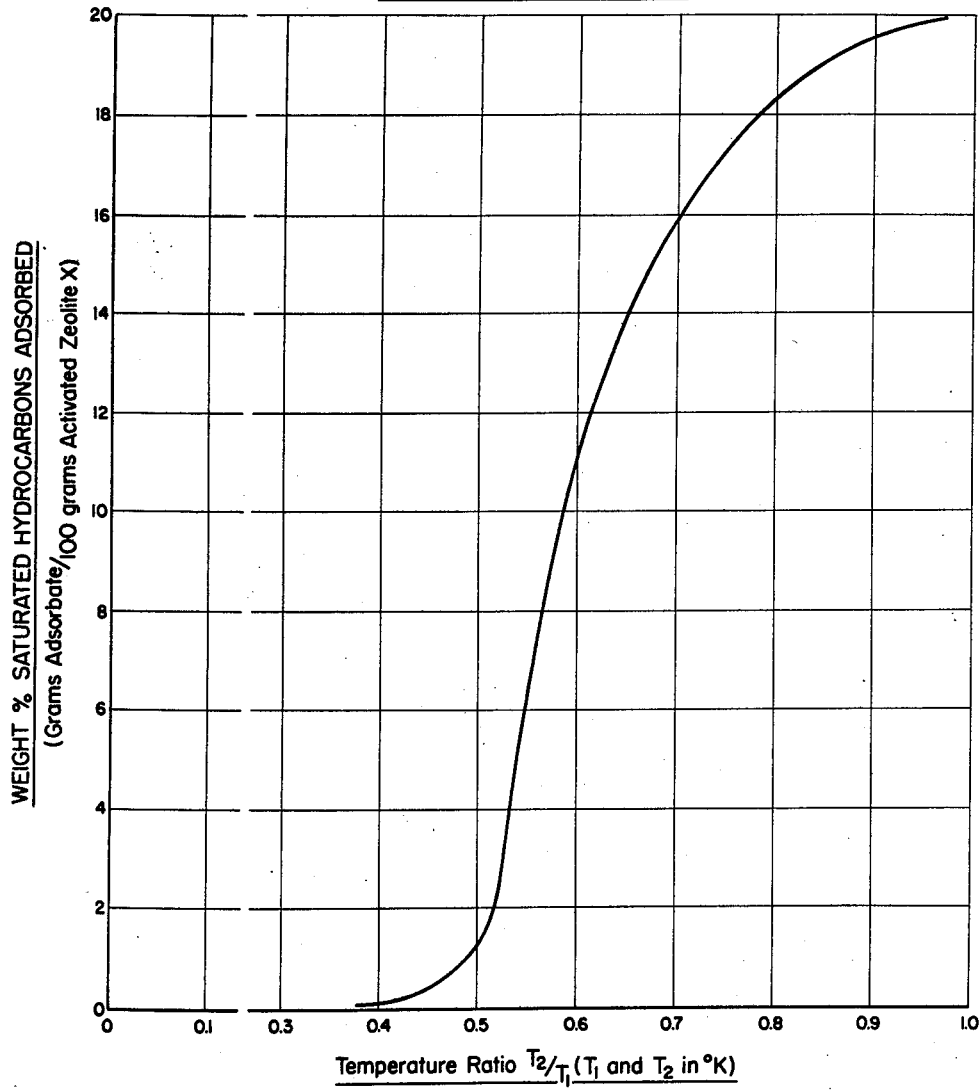
FIGURE 2 is a graph showing the weight percent of saturated hydrocarbons adsorbed versus the temperature ratio $T_2/T_1$ for zeolite X.
Figure 3:
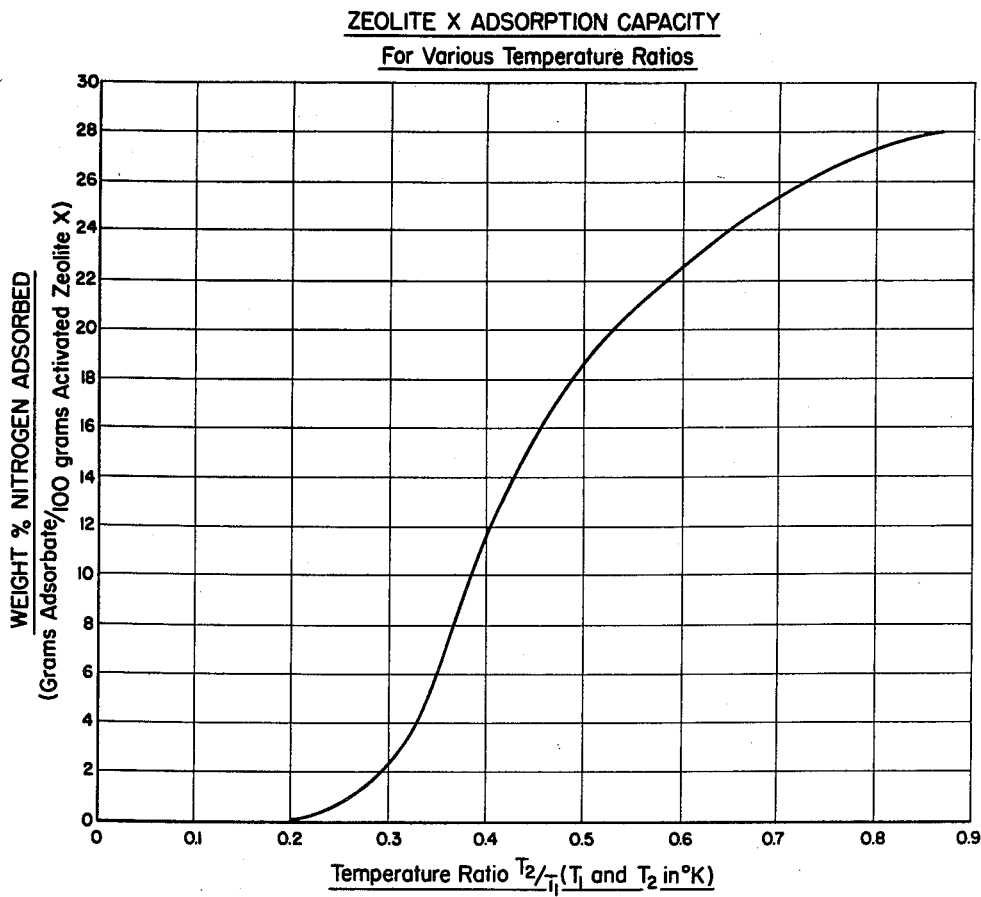
FIGURE 3 is a graph showing the weight percent of nitrogen adsorbed versus the temperature ratio $T_2/T_1$ for zeolite X.

This relationship is clearly shown in FIG. 1 which is a plot of the weight percent of hydrocarbons adsorbed versus the temperature ratio $T_2/T_1$ for zeolite X. The adsorbate in all examples upon which the plot of FIGURE 1 is based are unsaturated aliphatic hydrocarbons containing less than five carbon atoms per molecule, namely acetylene, ethylene, propylene and butene. The plots of FIGURES 2 and 3 are presented to illustrate in conjunction with FIGURE 1 the preferential adsorption of unsaturated aliphatic hydrocarbons containing less than five carbon atoms per molecule which is obtained through the use of zeolite X. The following Tables II, III and IV contain data from which FIGURES 1, 2 and 3 respectively, were prepared.

TABLE II

| Adsorbate | Pressure, mm. Hg | Weight Percent Adsorbed | $T_1$, °K. | $T_2$, °K. | $T_2/T_1$ |
|---|---|---|---|---|---|
| $C_2H_4$ | 5 | 1.4 | 298 | 115 | 0.39 |
| | 25 | 6.1 | 298 | 127 | 0.43 |
| | 37 | 7.1 | 298 | 131 | 0.44 |
| | 160 | 10.1 | 298 | 146 | 0.49 |
| $C_2H_6$ | 1 | 6.0 | 298 | 141 | 0.47 |
| | 5 | 10.6 | 298 | 152 | 0.51 |
| | 0.1 | 2.2 | 298 | 127 | 0.43 |
| | 2 | 8.5 | 298 | 145 | 0.49 |
| | 48 | 14.9 | 298 | 178 | 0.60 |
| Butene-1 | 0.1 | 9.9 | 298 | 149 | 0.50 |
| | 5 | 17.0 | 298 | 184 | 0.62 |
| | 350 | 19.6 | 298 | 248 | 0.83 |
| $C_2H_2$ | 1 | 4.6 | 298 | 130 | 0.44 |
| | 5 | 6.6 | 298 | 140 | 0.47 |
| | 25 | 9.8 | 298 | 152 | 0.51 |
| | 200 | 13.3 | 298 | 173 | 0.58 |
| | 740 | 14.7 | 298 | 190 | 0.64 |

TABLE III

| Adsorbate | Pressure, mm. Hg | Weight Percent Adsorbed | $T_1$, °K. | $T_2$, °K. | $T_2/T_1$ |
|---|---|---|---|---|---|
| $CH_4$ | 500 | less than 1 | 296 | 106 | 0.36 |
| $C_2H_6$ | 5 | 0.2 | 296 | 125 | 0.42 |
| | 25 | 0.8 | 296 | 145 | 0.49 |
| | 300 | 8.3 | 296 | 168 | 0.56 |
| | 700 | 10.2 | 296 | 183 | 0.61 |
| $C_3H_8$ | 1 | 0.8 | 296 | 144 | 0.48 |
| | .5 | 3.1 | 296 | 158 | 0.53 |
| | 4 | 2.6 | 296 | 161 | 0.54 |
| | 25 | 11.1 | 296 | 174 | 0.58 |
| | 700 | 14.6 | 296 | 233 | 0.78 |

TABLE IV

| Adsorbate | Pressure, mm. Hg | Weight percent adsorbed | $T_1$, °K. | $T_2$, °K. | $T_2/T_1$ |
|---|---|---|---|---|---|
| Nitrogen | 5 | 24.8 | 77 | 52 | 0.68 |
| Do | 195 | 27.5 | 77 | 67 | 0.81 |
| Do | 500 | 9.6 | 198 | 71 | 0.36 |
| Do | 500 | less than 1 | 298 | 71 | 0.24 |
| Do | 738 | 9 | 198 | 78 | 0.39 |

An inspection of Table I will reveal that it includes acetylene, ethylene, propeylene and butene at temperatures of 25° C. and adsorbate pressures from 0.1 mm. Hg to 740 mm. Hg. It was unexpectedly discovered that all of the unsaturated aliphatic hydrocarbons having less than five carbon atoms per molecule being freely adsorbed on zeolite X exhibit the same temperature ratio $T_2/T_1$ relationship to weight percent of hydrocarbon adsorbed. That is, for a given $T_2/T_1$ value, the weight percent of hydrocarbon adsorbed will be the same for all of the previously defined hydrocarbons. The present invention utilizes this relationship in combination with the previously discussed unsaturated compound selectivity property of zeloite X to provide a novel separation process.

The present invention combines the previously discussed characteristics and properties of zeolite X in such a manner that a novel process is provided for separating unsaturated aliphatic hydrocarbons containing less than five carbon atoms per molecule from a vapor mixture containing at least one member of the group consisting of normal saturated aliphatic hydrocarbons containing less than four carbon atoms per molecule, oxygen, hydrogen and nitrogen. In its broadest form, the process consists of contacting the vapor mixture with a bed of at least partially dehydrated crystalline zeolite X adsorbent material. The unsaturated aliphatic hydrocarbon-depleted vapor mixture is then discharged from the crystalline zeolite X bed. Such contact is preferably effected under conditions such that the temperature ratio $T_2/T_1$ with respect to the inlet end of the bed and with respect to at least one of the unsaturated aliphatic hydrocarbons of the vapor mixture is between 0.41 and 1.0 where $T_1$ is the adsorption temperature and is less than 973° K., and $T_2$ is the temperature at which the one unsaturated aliphatic hydrocarbon has a vapor pressure equal to its partial pressure in the vapor mixture. The lower limit of 0.41 for the temperature ratio $T_2/T_1$ is fixed by the discovery that below this value there is a smaller percentage change in adsorption capacity per unit change in the temperature ratio. In contrast, above 0.41 there is a larger percentage change in adsorption capacity per unit change in the temperature ratio. Stated in another way, if it is desired to obtain a certain incremental adsorbate loading at a specified adsorption temperature with a given feed stream, it would be necessary to increase the pressure of operation by a greater percent if the temperature ratio is below 0.41 than if it is maintained above this value in accordance with the invention. Also, the temperature ratio of 0.41 corresponds to a bed loading of about 1.8 weight percent adsorbate and if the temperature ratio were reduced below this value, a larger adsorption bed would be required with its attendant higher investment and operating expenses.

The upper limit of 1.0 for the temperature ratio should not be exceeded, because if the adsorption temperature is equal to or less than the dew point, condensation of the aliphatic hydrocarbon will occur, thereby essentially eliminating the sieving action of the zeolite X adsorbent. The broad upper limit of 973° K. for $T_1$ is due to the fact that above this temperature, the crystal structure of zeolite X will be disrupted or damaged with consequent loss of adsorption capacity and reduction in pore size, thereby fundamentally changing its adsorptive characteristics.

For acetylene adsorption, the present process is most efficiently performed if $T_1$, the adsorption temperature is less than 477° K. but higher than 233° K. This is for the reason that above such range, the acetylene in contact with zeolite X will tend to isomerize, aromatize and polymerize, all of which will clog the pores and cause loss of capacity of the zeolite X molecular sieve. Below 233° K. relatively economical refrigerants such as Freon-12 cannot be employed, thereby necessitating more expensive refrigerating systems. Also, the mechanical properties of metals deteriorate rapidly below about 230° K., so that special construction materials must be employed for adsorbers operating in this low temperature range. The increase in zeolite X adsorptive capacity for acetylene at reduced temperatures justifies the employment of refrigeration down to the 233° K. level. Furthermore, for maximum efficiency, $T_2$ is preferably below 313° K. which is the critical temperature of acetylene. This is to more effectively utilize the adsorptive capacity of zeolite X.

For olefin adsorption, the present process is most efficiently performed if $T_1$, the adsorption temperature, is less than 533° K. but higher than 233° K. This is for the reason that above this range, the olefin in contact with zeolite X will tend to isomerize, aromatize and polymerize, all of which will clog the pores and cause loss of capacity of zeolite X molecular sieve. The reason for the preferred lower limit of 233° K. is the same as previously discussed for acetylene adsorption. Also, the maximum efficiency, $T_2$ is preferably below 431° K., the critical temperature of butene. If only ethylene is present, $T_2$ is preferably below 283° K., the critical temperature of ethylene, to more effectively utilize the adsorptive capacity of zeolite X.

The present invention also contemplates a process for continuously separating unsaturated aliphatic hydrocarbons containing less than five carbon atoms per molecule from a vapor mixture containing at least one member of the group consisting of normal saturated aliphatic hydrocarbons containing less than four carbon atoms per molecule, oxygen, hydrogen and nitrogen. This continuous process includes two steps, an adsorption stroke and a regeneration stroke. The adsorption stroke is the same as the previously described adsorption where the temperature ratio $T_2/T_1$ is between 0.41 and 1.0 and the broad range for $T_1$ is less than 973° K. In the regeneration stroke, at least part of the adsorbed unsaturated aliphatic hydrocarbon is removed by subjecting the zeolite X adsorbent to conditions such that the temperature ratio $T_2/T_1$ at the end of the regeneration stroke with respect to at least one of the adsorbed unsaturated aliphatic hydrocarbons, is less than the temperature ratio at the end of the adsorption stroke. Also, the difference in total adsorbate loading betwen the ends of the adsorption and regeneration strokes is at least 0.1 weight percent for increased efficiency of the overall continuous process. A lower differential adsorbate loading would entail prohibitively large adsorber units. During the regeneration stroke, $T_1$ is the regeneration temperature and is less than 973° K. for the broad range, and $T_2$ is the temperature at which the previously mentioned one adsorbed unsaturated aliphatic hydrocarbon has a vapor pressure equal to the partial pressure of the hydrocarbon over the zeolite X bed at the end of the regeneration. It will be understood by those skilled in the art that at least two adsorbent beds may be provided, with one bed on adsorption stroke and the other bed on regeneration stroke. The respective flows are then periodically switched when the first bed becomes loaded with the adsorbate, so that the latter is placed on regeneration stroke and the second bed is placed on-stream.

For acetylene adsorption, the continuous process is most efficiently performed if $T_1$, the adsorption temperature, is less than 477° K. but higher than 233° K. for previously stated reasons. Also, for maximum efficiency during the adsorption stroke, $T_2$ is below 313° K. During the regeneration stroke, $T_1$ is preferably below 477° K. and above 233° K., also for the previously discussed reasons.

For olefin adsorption, the continuous process is most efficiently performed if $T_1$, the adsorption temperature is less than 533° K. but higher than 233° K. for previously stated reasons. Also, for maximum efficiency during the adsorption stroke, $T_1$ is preferably below 533° K. and above 233° K. also for the previously discussed reasons. Finally, the difference in total olefin loadings between the ends of the adsorption and regeneration strokes is preferably at least 0.5 weight percent. This is for the reason that the olefin adsorbate is preferably recovered from the zeolitic molecular sieve bed as a valuable product, thereby necessitating a relatively high loading differential to warrant such recovery.

It will be understood by those skilled in the art that the temperature ratio may be adjusted by well-known methods, as for example, heating the bed by direct or indirect heat transfer, employing a purge gas, or by drawing a vacuum on the bed during the regeneration stroke. Also, during the regeneration stroke the ratio may be adjusted for favorable operation by varying either or both the temperature and the pressure.

The many advantages of the invention are illustrated by the following examples:

*Example I*

A vapor mixture is provided containing 0.5 mole fraction propylene, the remainder being propane, at a total pressure of 50 p.s.i.a. The mixture is to be contacted with a bed of zeolite X at a temperature of 150° C. The zeolite bed is to be regenerated for continuous operation.

The potential capacity of the bed to adsorb propylene at the bed inlet section may be determined as follows: Since the partial pressure of propylene is 25 p.s.i.a., $T_2$ will be 239° K. as read from the previously referenced vapor pressure table. Accordingly, $$T_2/T_1 \text{ will be } \frac{239}{423} \text{ or } 0.57$$

This temperature ratio will provide a loading of 14 weight percent of propylene on the zeolite X adsorbent as determined by a reading of the FIG. 1 graph. The potential capacity of the adsorbent bed inlet end for propane may be determined in a similar manner by reference to FIG. 2 so that the value for propane is 9.0 weight percent. The adsorption stroke may be terminated when traces of propylene first appear in the effluent if complete elimination of propylene from the effluent is desired.

During the regeneration stroke, the bed temperature is kept at 423° K. while reducing the pressure of the bed to about 1 p.s.i.a., corresponding to a $T_2$ value of 178° K. with respect to propylene. Under these conditions, the $T_2/T_1$ ratio will be 0.42 and the residual loading of propylene will be reduced to about 2 weight percent.

*Example II*

A vapor mixture is provided containing 0.005 mole fraction acetylene, the remainder being methane at a total pressure of 500 p.s.i.a. The mixture is contacted with a bed of zeolite X at 25° C., and the latter may be regenerated by heating the feed stream and passing it through the bed as a purge gas. Under these conditions, the potential capacity of the zeolite X bed to adsorb these hydrocarbons at the bed inlet section may be determined in the same manner as previously described in conjunction with Example I. That is, for acetylene at the bed inlet section, $T_2$ will be 168° K. so that the temperature ratio is 0.45 which corresponds to a loading of 5.5 weight percent acetylene on the adsorbent as read from FIG. 1. The potential capacity of the adsorbent bed at the inlet end for methane may be determined in a similar manner by reference to FIG. 2, so that the value for methane is about 0.7 weight percent.

Assuming a desired residual acetylene loading of less than 2 weight percent, regeneration of the zeolite X used in Example II can be readily achieved by employing the feed gas as a purging medium, and heating the bed and/or such gas to provide a regeneration temperature of 400° K. (127° C.). This temperature is based on a $T_2/T_1$ value of 0.42 as read from FIG. 1 at a loading of about 2 weight percent and a $T_2$ of 168° K.

Alternatively, if regeneration is to be effected by drawing a vacuum pressure of 50 mm. Hg on the bed, $T_2$ would be 158° K. This temperature corresponds to the vapor pressure of acetylene at 50 mm. Hg, as read from the previously referenced table. Since the residual acetylene loading is to be about 2 weight percent, $T_2/T_1$ will be 0.42 as read from FIG. 1. With this value for the temperature ratio, the required $T_1$ is 378° K.

When the vapor mixture contains nitrogen, the potential capacity of the zeolite X adsorbent for this constituent is similarly determined by reference to the vapor pressure tables and FIGURE 3. Also, if oxygen or hydrogen is present, the potential capacity of zeolite X for these constituents may be determined in an analogous manner.

Although the preferred embodiments have been described in detail, it is contemplated that modifications of the process may be made and that some features may be employed without others, all within the spirit and scope of the invention as set forth herein.

What is claimed is:

1. A process for separating unsaturated aliphatic hydrocarbons containing less than five carbon atoms per molecule from a vapor mixture containing such unsaturated aliphatic hydrocarbons and at least one normal saturated aliphatic hydrocarbon having less than four carbon atoms per molecule, which comprises contacting said vapor mixture with a bed of at least partially dehydrated crystalline zeolite X adsorbent material, and thereafter discharging the unsaturated aliphatic hydrocarbon depleted vapor stream from said bed.

2. A process for separating unsaturated aliphatic hydrocarbons containing less than five carbon atoms per molecule from a vapor mixture containing such unsaturated aliphatic hydrocarbons and methane, which comprises contacting said vapor mixture with a bed of at least partially dehydrated crystalline zeolite X adsorbent material, and thereafter discharging the unsaturated aliphatic hydrocarbon depleted vapor stream from said bed.

3. A process for separating unsaturated aliphatic hydrocarbons containing less than five carbon atoms per molecule from a vapor mixture containing such unsaturated aliphatic hydrocarbons and ethane, which comprises contacting said vapor mixture with a bed of at least partially dehydrated crystalline zeolite X adsorbent material, and thereafter discharging the unsaturated aliphatic hydrocarbon depleted vapor stream from said bed.

4. A process for separating unsaturated aliphatic hydrocarbons containing less than five carbon atoms per molecule from a vapor mixture containing such unsaturated aliphatic hydrocarbons and propane, which comprises contacting said vapor mixture with a bed of at least partially dehydrated crystalline zeolite X adsorbent material, and thereafter discharging the unsaturated aliphatic hydrocarbon depleted vapor stream from said bed.

5. A process for separating unsaturated aliphatic hydrocarbons containing less than five carbon atoms per molecule from a vapor mixture containing such unsaturated aliphatic hydrocarbons and oxygen, which comprises contacting said vapor mixture with a bed of at least partially dehydrated crystalline zeolite X adsorbent material, and thereafter discharging the unsaturated aliphatic hydrocarbon depleted vapor stream from said bed.

6. A process for separating unsaturated aliphatic hydrocarbons containing less than five carbon atoms per molecule from a vapor mixture containing such unsaturated aliphatic hydrocarbons and hydrogen, which comprises contacting said vapor mixture with a bed of at least partially dehydrated crystalline zeolite X adsorbent material, and thereafter discharging the unsaturated aliphatic hydrocarbon depleted vapor stream from said bed.

7. A process for separating unsaturated aliphatic hydrocarbons containing less than five carbon atoms per molecule from a vapor mixture containing such unsaturated aliphatic hydrocarbons and nitrogen, which comprises contacting said vapor mixture with a bed of at least partially dehydrated crystalline zeolite X adsorbent material, and thereafter discharging the unsaturated aliphatic hydrocarbon depleted vapor stream from said bed.

References Cited in the file of this patent

UNITED STATES PATENTS

| | | |
|---|---|---|
| 2,413,134 | Barrer | Dec. 24, 1946 |
| 2,442,191 | Black | May 25, 1948 |
| 2,882,244 | Milton | Apr. 14, 1959 |
| 2,944,092 | Feldbauer et al. | July 5, 1960 |
| 2,950,952 | Breck et al. | Aug. 30, 1960 |

OTHER REFERENCES

"Separation of Mixtures Using Zeolites as Molecular Sieves. Part I. Three Classes of Molecular-Sieve Zeolite," by R. M. Barrer, J. Soc. Chem. Ind., vol. 64, May 1945, pp. 130–135.

"Crystalline Zeolites. I. The Properties of a New Synthetic Zeolite, Type A," by D. W. Breck Jr. et al., of the Amer. Chem. Soc., vol. 78, No. 23, Dec. 8, 1956, pp. 5963–5971.

"Examine These Ways to Use Selective Adsorption," article in Petroleum Refiner, vol. 36, No. 7, July 1957, pp. 136–140.